April 15, 1930.  E. A. HALL  1,754,270
ROLL CONSTRUCTION FOR GRIST MILLS
Filed April 20, 1928
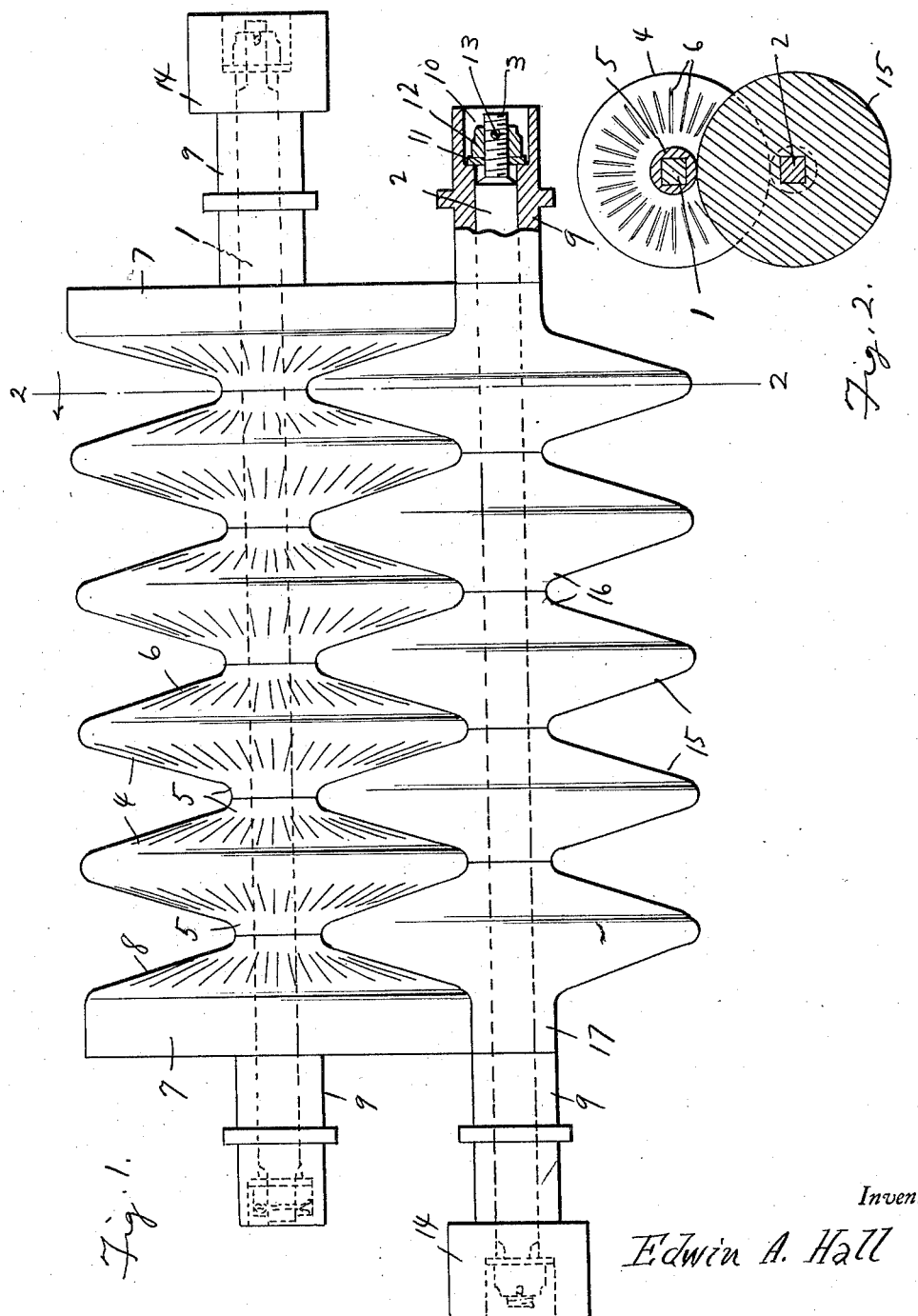
Inventor
Edwin A. Hall
By Clarence A. O'Brien
Attorney Patented Apr. 15, 1930

1,754,270

UNITED STATES PATENT OFFICE

EDWIN A. HALL, OF DAGGETT, MICHIGAN

ROLL CONSTRUCTION FOR GRISTMILLS

Application filed April 20, 1928. Serial No. 271,527.

The present invention relates to improvements in grinding mills, and has reference more particularly to the crushing rolls of a gristmill.

One of the important objects of the present invention is to provide a roll construction wherein the shaft is rectangular in cross section, and a series of beveled grinding discs are removably arranged in abutting relation on the shaft whereby any one or all of said disks may be replaced when worn without necessitating the destruction of the entire roll.

A further object of the invention is to provide a roll construction which is simple, inexpensive, strong and durable and further well adapted to the purposes for which it is designed.

Other objects and advantages of the invention will become apparent from the following description when taken in connection with the accompanying drawing.

In the accompanying drawing wherein like reference characters indicate corresponding parts throughout the same:

Figure 1 is an elevational view showing a pair of cooperating crushing rolls arranged in operative relation, and Figure 2 is a sectional view taken approximately on the line 2—2 of Figure 1.

In the drawing wherein for the purpose of illustration is shown the preferred embodiment of my invention, the numerals 1 and 2 designate a pair of parallel spaced shafts, each being substantially rectangular in cross section, as clearly shown in Figure 2. Each end of each shaft is formed with a reduced threaded stem or spindle 3 as clearly shown in Figure 1, and the purpose thereof will be presently described.

A series of oppositely beveled disks 4 are slidably and removably arranged on the shaft 1, it being understood of course that the bore of each disk is square to conform to the shape of the shaft, and the hub portions 5 of the adjacent disks are disposed in abutting relation with respect to each other. Each of the independent disks 4 is formed with corrugations 6 on its respective sides. Also arranged on the shaft 1 are the end disks 7, the inner face only thereof being beveled as illustrated at 8, and the beveled inner face of each end disc is also formed with corrugations to cooperate with the corrugations of the outer beveled faces of the adjacent disks.

A sleeve 9 is disposed over the respective ends of the shaft 1 and the bore of each sleeve is also rectangular in cross section to prevent rotation of the sleeves on the shaft.

The outer end of each sleeve is formed with an enlarged socket 10 into which extends the respective threaded stem or spindle 3, and a ring 11 is disposed over each threaded spindle for engagement against the shoulder formed at the inner side of the socket 10.

A nut 12 is threaded on the threaded spindle 3 at each end of the shaft to urge the rings 11 against the respective shoulders and to maintain the disks in abutting relation with respect to each other on the shaft.

A cotter pin 13 extends transversely through each threaded stem and through suitable slots formed in the outer end of the nut to prevent rotation of said nut so that the same cannot become disengaged from the threaded stem, and this arrangement is more clearly shown in Figure 1, in the lower right hand corner.

A pulley 14 is arranged on the outer end of one pair of diagonally opposed sleeves for the purposes well known in the art.

The lower shaft 2 has supported thereon a series of independent oppositely beveled disks 15, the hubs 16 of which are formed with rectangular bores to cooperate with the rectangular shaft, and the endmost disks on the shaft 2 are formed with outwardly projecting hub extensions 17 with which the end disks 7 on the shaft 1 engage.

The disks 15 are not corrugated and are disposed in interfitting relation with respect to the corrugated disks 4 arranged on the shaft 1. The peripheral edge of each disk is rounded as illustrated in Figure 1.

The coacting rolls are supported in the grist mill in the usual manner, and as the supporting means forms no important part of the present invention, a detailed description thereof is thought unnecessary in the present instance.

By providing a series of disks for disposition on the square shafts in the manner as shown and described, said disks can be readily and easily assembled or disassembled, and worn or broken disks can be replaced, thus obviating the necessity of having to replace the entire roll where the grinding disks are of a unitary construction. Furthermore the corrugated disks may be replaced with smooth disks if so desired, depending upon the material that is being crushed.

The simplicity of my improved roll construction enables the same to be readily and easily assembled or disassembled and furthermore can be constructed at a very low cost, and will at all times be positive and efficient in its operation.

While I have shown the preferred embodiment of my invention it is to be understood that minor changes in the size, shape and arrangement of parts may be resorted to without departing from the spirit of the invention or the scope of the appended claim.

Having thus described the invention, what I claim as new and desire to secure by Letters Patent is:—

In a roll construction for grinding mills, a pair of parallel spaced non-circular shafts, a reduced threaded spindle formed on each end of each shaft, a plurality of independent operatively beveled disks, arranged on one shaft, a pair of end disks arranged on said shaft, the inner face only of each end disk being beveled, a series of oppositely beveled independent disks arranged on the other shaft for alternately fitting between the disks on the first mentioned shaft, the end disks of the second series having hub extensions on the outer side thereof with which the peripheral edges of the endmost disks of the first mentioned series engage, sleeves having non-circular bores disposed over the respective ends of each shaft, the outer end of each sleeve being formed with an enlarged socket into which the respective spindle extends, a ring surrounding each spindle in each of the sockets, and a nut threaded on each spindle to hold the respective ring against the inner end of the respective sockets as and for the purpose described.

In testimony whereof I affix my signature.

EDWIN A. HALL.